United States Patent
Sadeck

(10) Patent No.: US 7,416,158 B2
(45) Date of Patent: Aug. 26, 2008

(54) CONTINUOUS DISREEFING APPARATUS FOR PARACHUTE

(75) Inventor: James E. Sadeck, East Freetown, MA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 598 days.

(21) Appl. No.: 11/239,437

(22) Filed: Sep. 21, 2005

(65) Prior Publication Data

US 2008/0029649 A1    Feb. 7, 2008

(51) Int. Cl.
*B64D 17/24*    (2006.01)
(52) U.S. Cl. ...................... 244/149; 244/147
(58) Field of Classification Search .............. 244/149, 244/147, 142, 138 R
See application file for complete search history.

(56) References Cited

U.S. PATENT DOCUMENTS

| | | | |
|---|---|---|---|
| 2,929,589 A | 3/1960 | Carter | |
| 2,980,371 A | 4/1961 | Finney | |
| 3,047,261 A | 7/1962 | Bockelmann | |
| 3,726,500 A | 4/1973 | Bockelmann | |
| 4,540,145 A | 9/1985 | Matsuo | |
| 4,752,050 A | 6/1988 | Johnson | |
| 4,846,423 A | 7/1989 | Reuter | |
| 6,843,451 B1 | 1/2005 | Fox, Jr. | |
| 2002/0092952 A1 | 7/2002 | Parker | |
| 2003/0218100 A1 | 11/2003 | Preston | |
| 2004/0016851 A1 | 1/2004 | Preston | |
| 2004/0262457 A1 | 12/2004 | Jiang | |

FOREIGN PATENT DOCUMENTS

| WO | WO 02/076828 | 10/2002 |
|---|---|---|
| WO | WO 03/099655 | 12/2003 |

*Primary Examiner*—Timothy D Collins
(74) *Attorney, Agent, or Firm*—Vincent J. Ranucci

(57) ABSTRACT

A continuous disreefing apparatus has a sleeve that has a diameter and is made from a flexible, resilient material that allows the sleeve to diametrically contract when the sleeve is under tension and to diametrically relax when such tension is substantially reduced or removed. The sleeve has a portion thereof configured for connection to a parachute suspension line. The continuous disreefing apparatus includes a reefing line that extends through the sleeve and is arranged for movement through the sleeve wherein the rate at which the reefing line moves through the sleeve is controlled by the amount of tension on the sleeve.

15 Claims, 12 Drawing Sheets

CONTINUOUS DISREEFING APPARATUS FOR PARACHUTE

STATEMENT OF GOVERNMENT INTEREST

The invention described herein may be manufactured and used by the U.S. Government for Governmental purposes without the payment of any royalties thereon.

BACKGROUND OF THE INVENTION

1. Field of the Invention

The present invention generally relates to a continuous disreefing apparatus for use with parachutes.

2. Description of the Related Art

Military cargo parachute systems that are used for heavy cargo delivery typically use large diameter parachutes which are reefed to slow their opening, thereby reducing the forces on the entire system. Reefing cargo parachutes typically require the use of expensive pyrotechnic devices, such as cutters, configured with specific time delays. Some systems require multiple stages of reefing and multiple pyrotechnic devices. During each stage of reefing, the partially opened parachute canopy slows the velocity of the payload. Once the pyrotechnic device fires, the canopy will open to the next reefing stage or open fully. When disreefing occurs, a peak force is observed, producing repeated shocks to the parachute delivery system. Referring to FIGS. 1A and 1B, there is shown a prior art, reefed parachute. The reefed parachute canopy 10 is reefed by reefing line 12 which is attached to parachute skirt 14 by reefing rings 16 located at the attachment point of each suspension line 18. Reefing line 12 is sized to allow canopy 10 to initially open to some percent of its full, inflated diameter. Canopy 10 will remain in this configuration until pyrotechnic cutter 20 fires and disreefing occurs. This causes canopy 10 to open fully or to the next reefing stage. FIG. 1C illustrates the forces on a typical prior art parachute system over time from deployment to full opening without reefing. FIG. 1D illustrates the forces on the same type of prior art parachute system with a single stage of reefing. The time at which disreefing occurs is indicated by time TD. FIG. 1E illustrates the forces on the same type of prior art parachute system with multi-stage reefing. The times at which disreefing occurs are indicated by times TD1 and TD2. The forces illustrated in FIGS. 1C-1E demonstrate peak and repeated shocks to the parachute system even when reefing is employed.

What is needed is an apparatus that provides continuous, smooth and consistent disreefing that causes the parachute canopy to open slowly and reduce or minimize peak and repeated shocks on the parachute system.

SUMMARY OF THE INVENTION

The present invention is a continuous disreefing apparatus that provides continuous, consistent and smooth disreefing while using any one of load bearing suspension lines of the parachute system to provide sensing of forces in the parachute system. The continuous disreefing apparatus of the present invention does not utilize pyrotechnics, electronics or electromechanical systems. The continuous disreefing apparatus of the present invention reduces or minimizes peak and repeated shocks on the parachute system.

In one aspect, the present invention is directed to a continuous disreefing apparatus that comprises a sleeve that has a diameter and is made from a flexible, resilient material that allows the sleeve to diametrically contract when the sleeve is under tension and to diametrically relax when such tension is substantially reduced or removed. The sleeve has a portion thereof configured for connection to a parachute suspension line. The continuous disreefing apparatus includes a reefing line that extends through the sleeve and is arranged for movement through the sleeve. The rate at which the reefing line moves through the sleeve is determined by the amount of tension on the sleeve. The amount of tension on the sleeve is determined by the magnitude of the force on the parachute suspension line to which the sleeve is connected.

The continuous disreefing apparatus includes a parachute suspension system which has suspension lines, and the suspension system including the suspension lines performs as a mechanical sensing device for automatically controlling the function of continuous disreefing.

Other objects, features and advantages of the present invention will be apparent from the ensuing description.

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, in which.

DESCRIPTION OF THE PREFERRED EMBODIMENTS

Figure 1A:
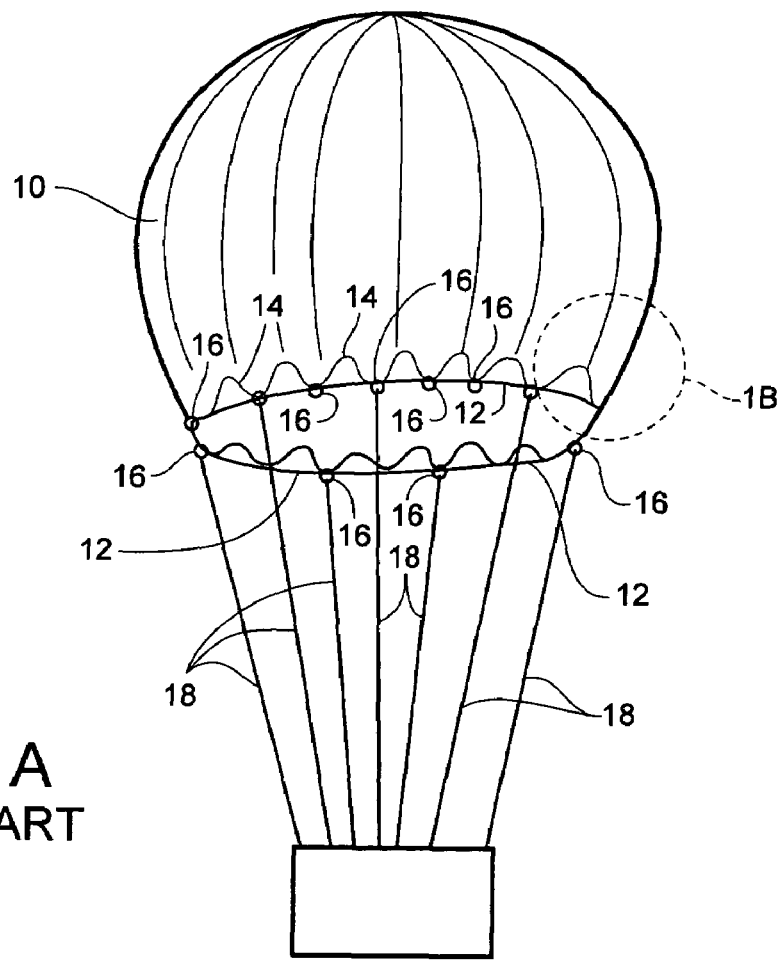
FIG. 1A is a front elevational view of a prior art parachute system.
Figure 1B:
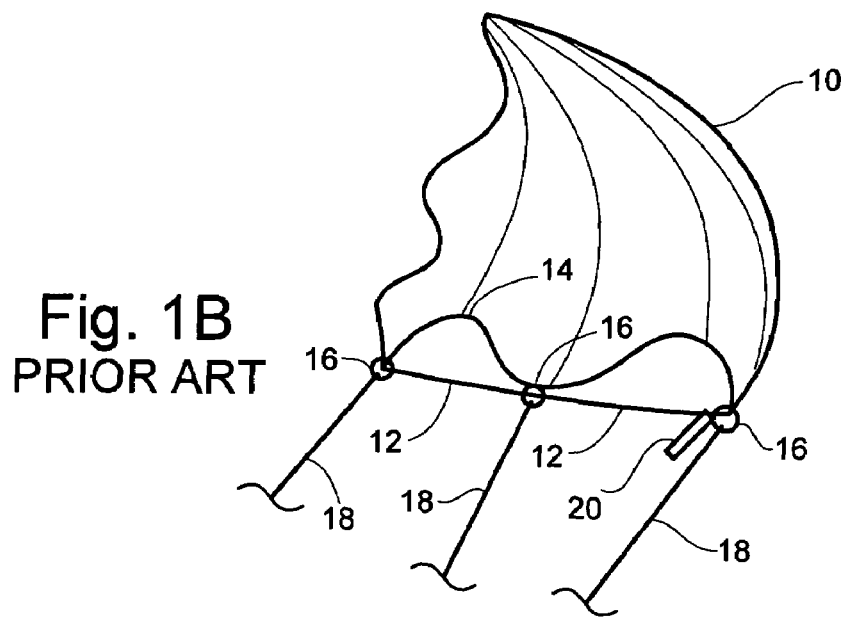
FIG. 1B is an enlarged view of a portion of the view of FIG. 1A.
Figure 1C:
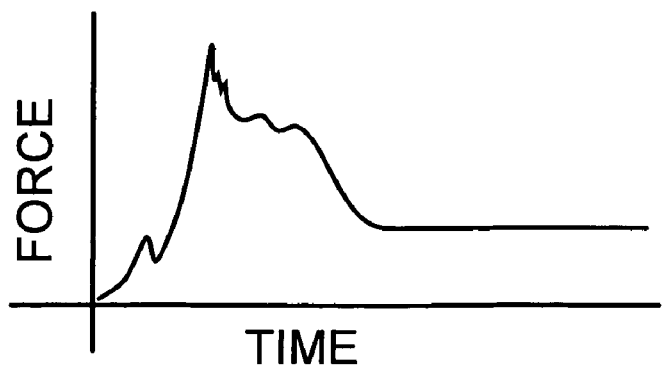
FIGS. 1C-1E are graphs illustrating forces on prior art parachute systems during the parachute opening process.
Figure 1D:
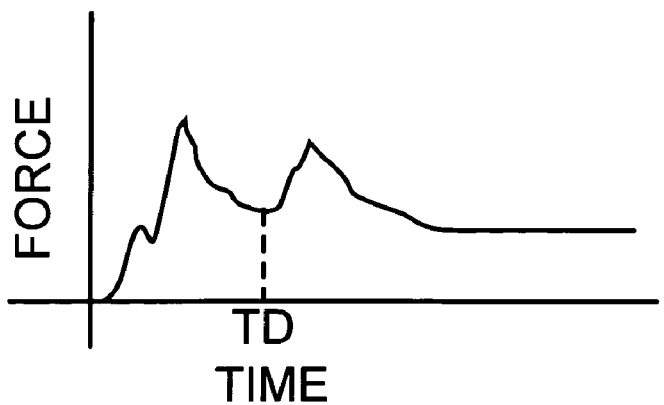
Figure 1E:
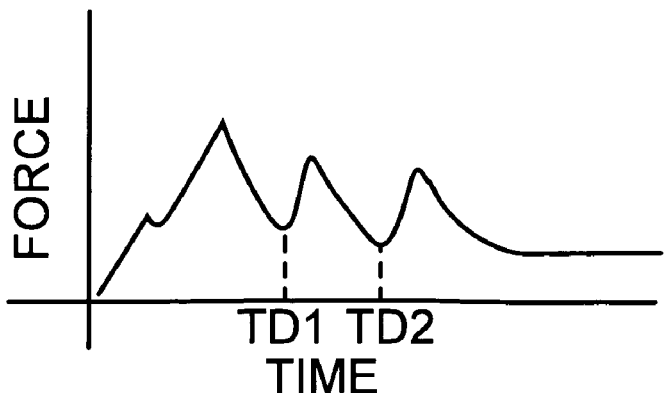
Figure 2:
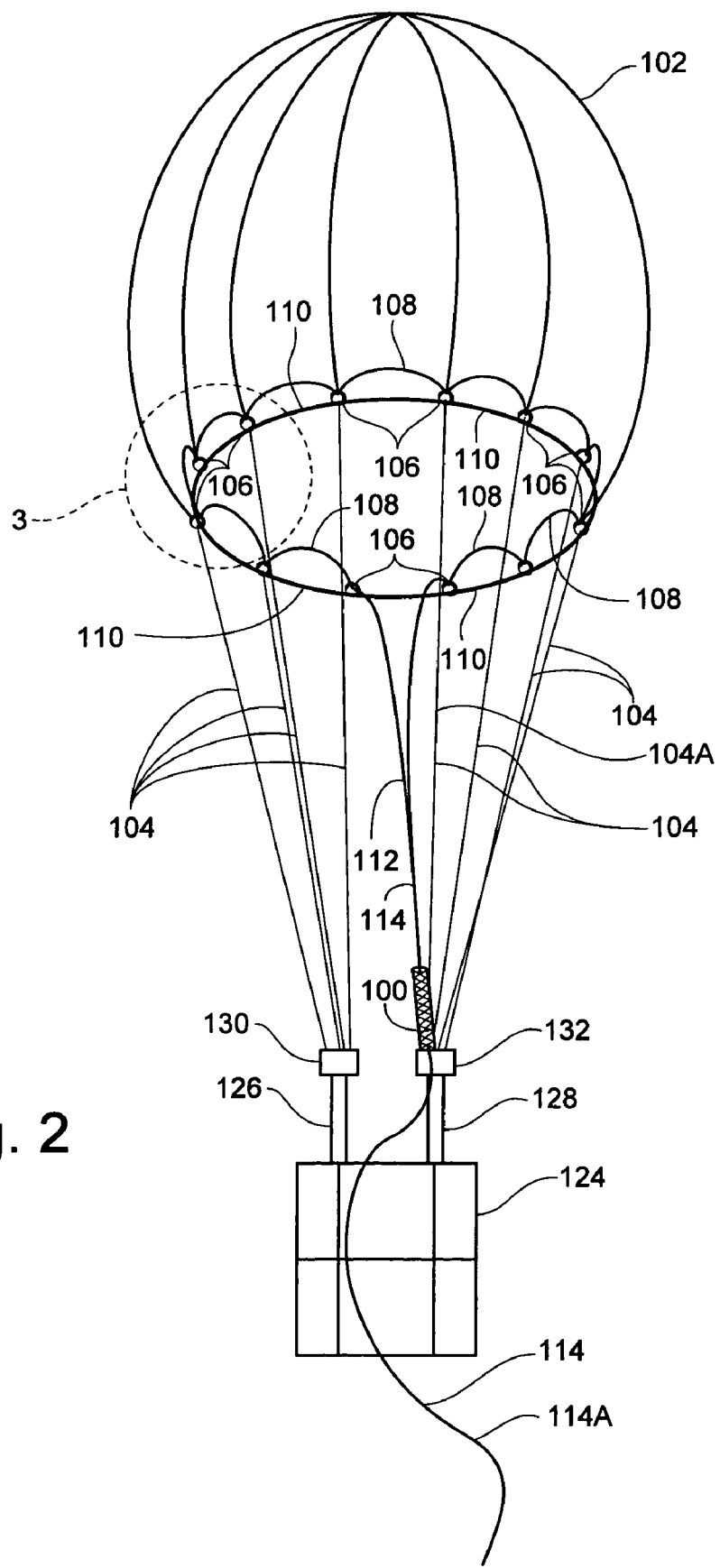
FIG. 2 is a front elevational view of a parachute system that utilizes the continuous disreefing apparatus of the present invention.
Figure 3:
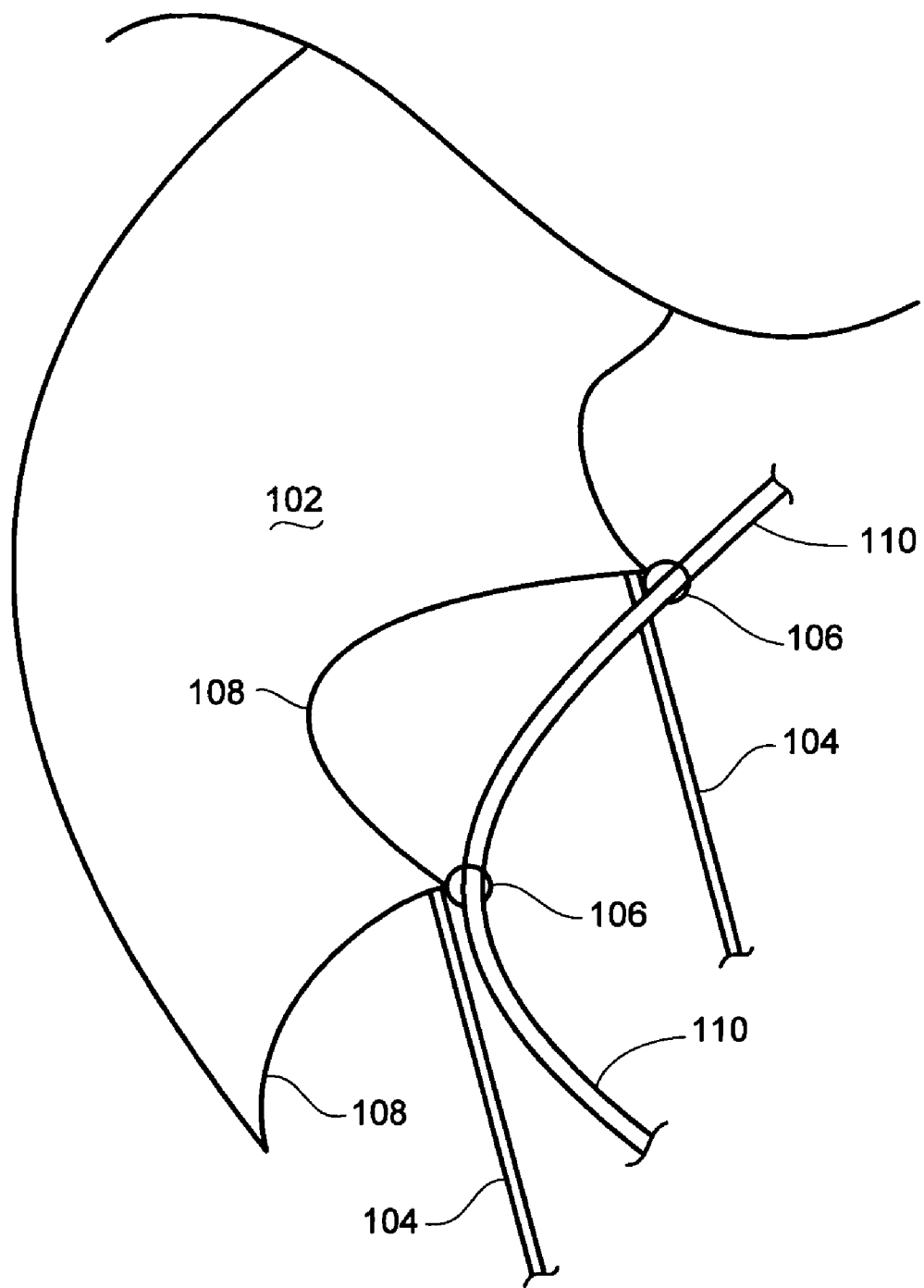
FIG. 3 is an enlarged view of a portion of the view of FIG. 2.

Referring to FIGS. 2 and 3, there is shown a parachute system that utilizes continuous disreefing apparatus 100 of the present invention. The parachute system includes canopy 102, suspension lines 104 and reefing rings 106. Canopy 102 has canopy skirt 108. Each reefing ring 106 is attached to canopy skirt 108 at the attachment point of a corresponding suspension line 104. The parachute system also includes reefing line 110 that passes through reefing rings 106. The ends of reefing line 110 are joined together at junction 112 to form single reefing line 114.

Figure 4A:
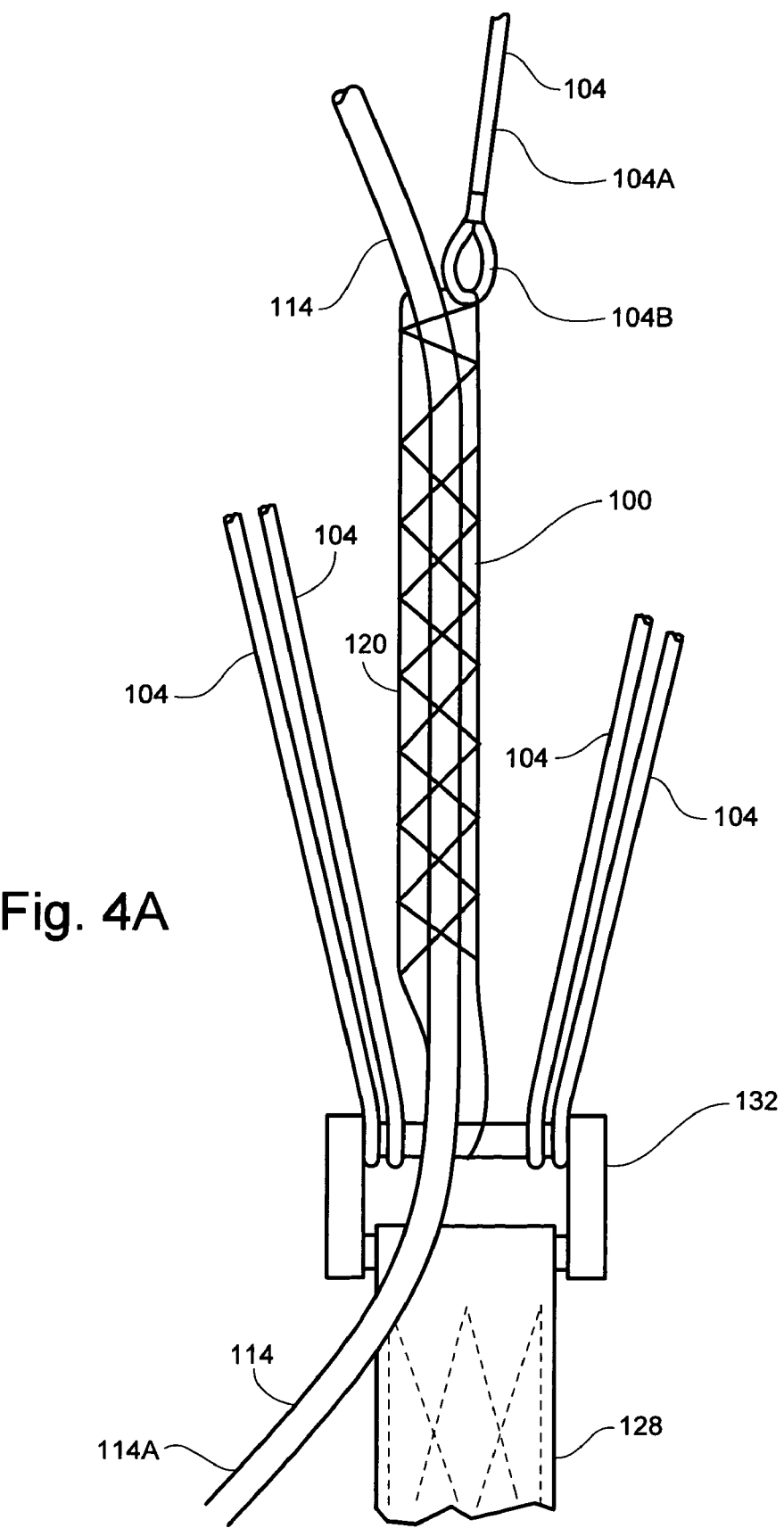
FIG. 4A is an elevational view of the continuous disreefing apparatus of the present invention.

Referring to FIG. 4A, there is shown continuous disreefing apparatus 100 of the present invention. Continuous disreefing apparatus 100 comprises sleeve 120. In a preferred embodiment, sleeve 120 is configured as a coarse braided, generally cylindrical sleeve. In one embodiment, this coarse braided sleeve is fabricated from high-strength, flexible, resilient material that is capable of withstanding high temperatures. Suitable flexible materials include steel wire, cable, aramid or coated materials that provide the required high-strength and high-temperature characteristics.

As shown in FIGS. 2 and 4A, load 124 is attached to risers 126 and 128. Risers 126 and 128 are connected to links 130 and 132, respectively. Risers 126 and 128 and riser links 130 and 132 are well known in the art and therefore, are not discussed in detail. Continuous disreefing apparatus 100 is connected to link 132.

Referring to FIG. 4A, in accordance with the invention, one of the suspension lines 104, indicated by reference number 104A, functions as a sensing suspension line for sensing a force, i.e., tension. Said sensing suspension line 104A may be any one of the suspension lines 104. This characteristic is explained in detail in the ensuing description. Suspension line 104A is relatively shorter than the other suspension lines 104 and is connected to sleeve 120 in such a manner that tension on suspension line 104A causes the diameter of sleeve 120 to contract. This contraction produces friction on single reefing line 114 thereby increasing the force needed to pull single reefing line 114 through sleeve 120. Conversely, a relaxation of the tension on suspension line 104A allows relaxation and expansion of sleeve 120 which decreases the force needed to pull single reefing line 114 through sleeve 120. In an alternate embodiment, reefing line 114A is integral with sleeve 120. As shown in FIG. 4A, loop 104B is formed at the end of suspension line 104A. Loop 104B passes through the upper end of sleeve 120.

Figure 4B:
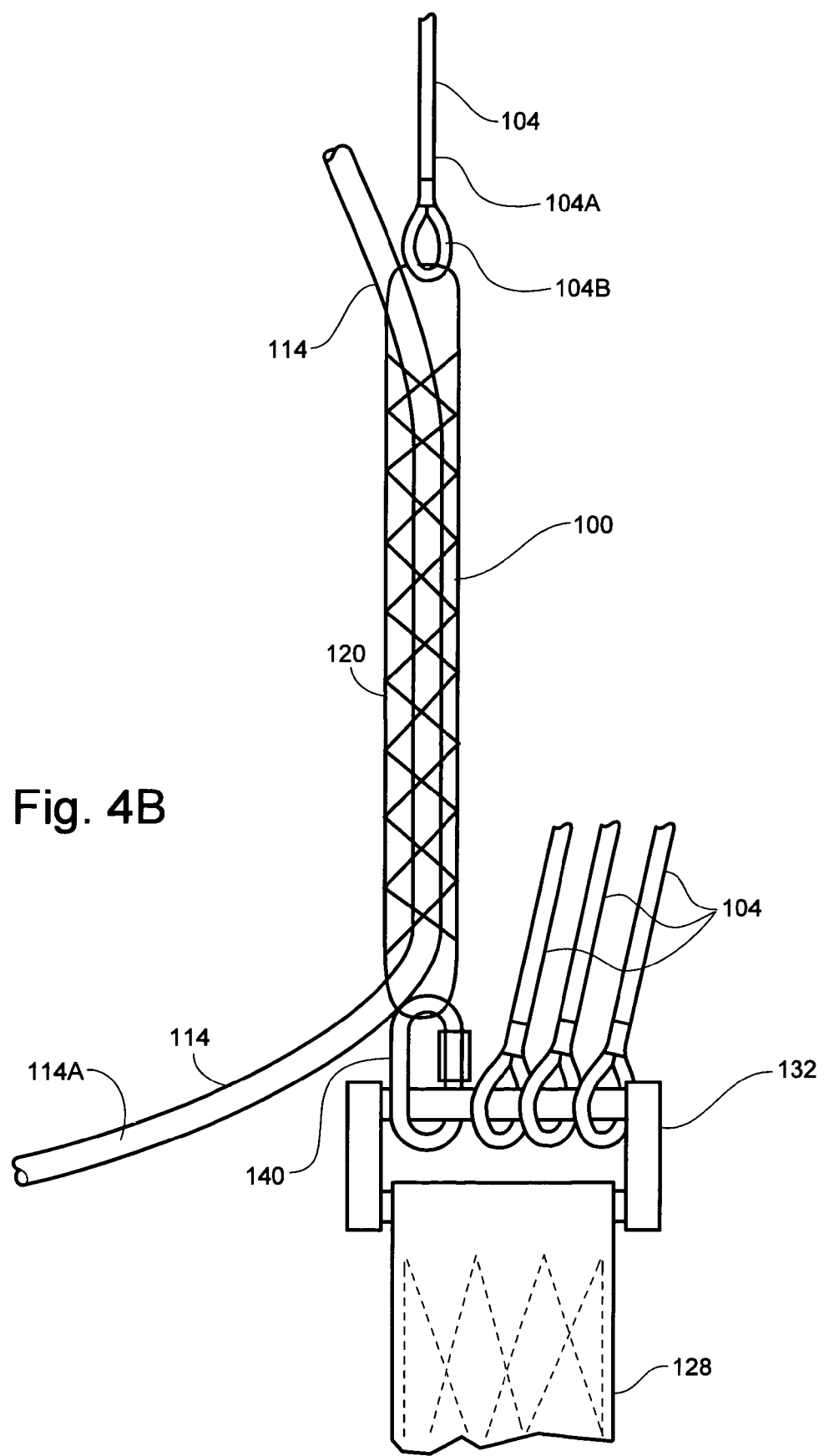
FIG. 4B is an elevational view of the continuous disreefing apparatus of the present invention configured to be removably connected to a riser link.
Figure 4C:
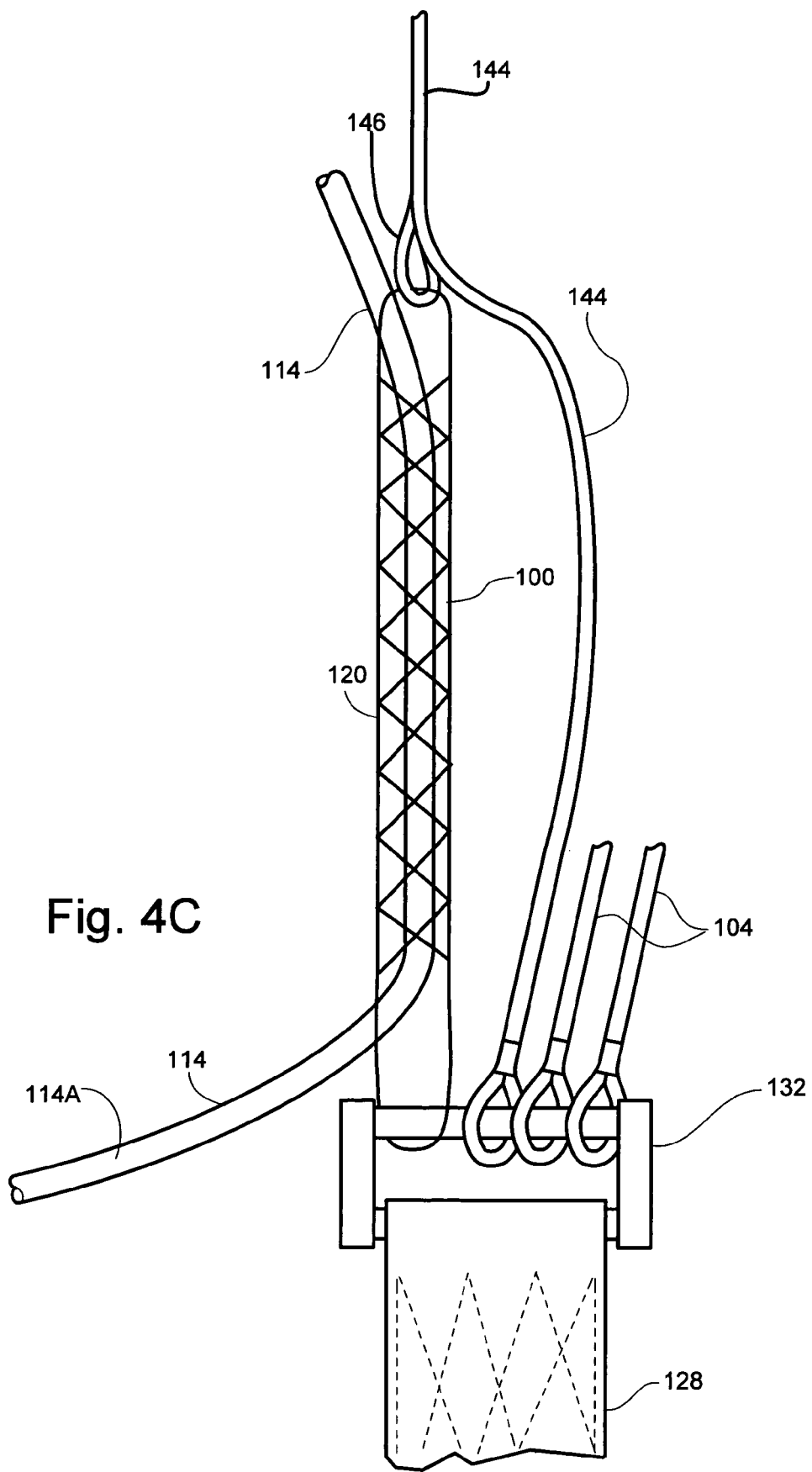
FIG. 4C is an elevational view of the continuous disreefing apparatus of the present invention utilizing an alternate technique for connecting a sensing suspension line to the continuous disreefing apparatus.
Figure 4D:
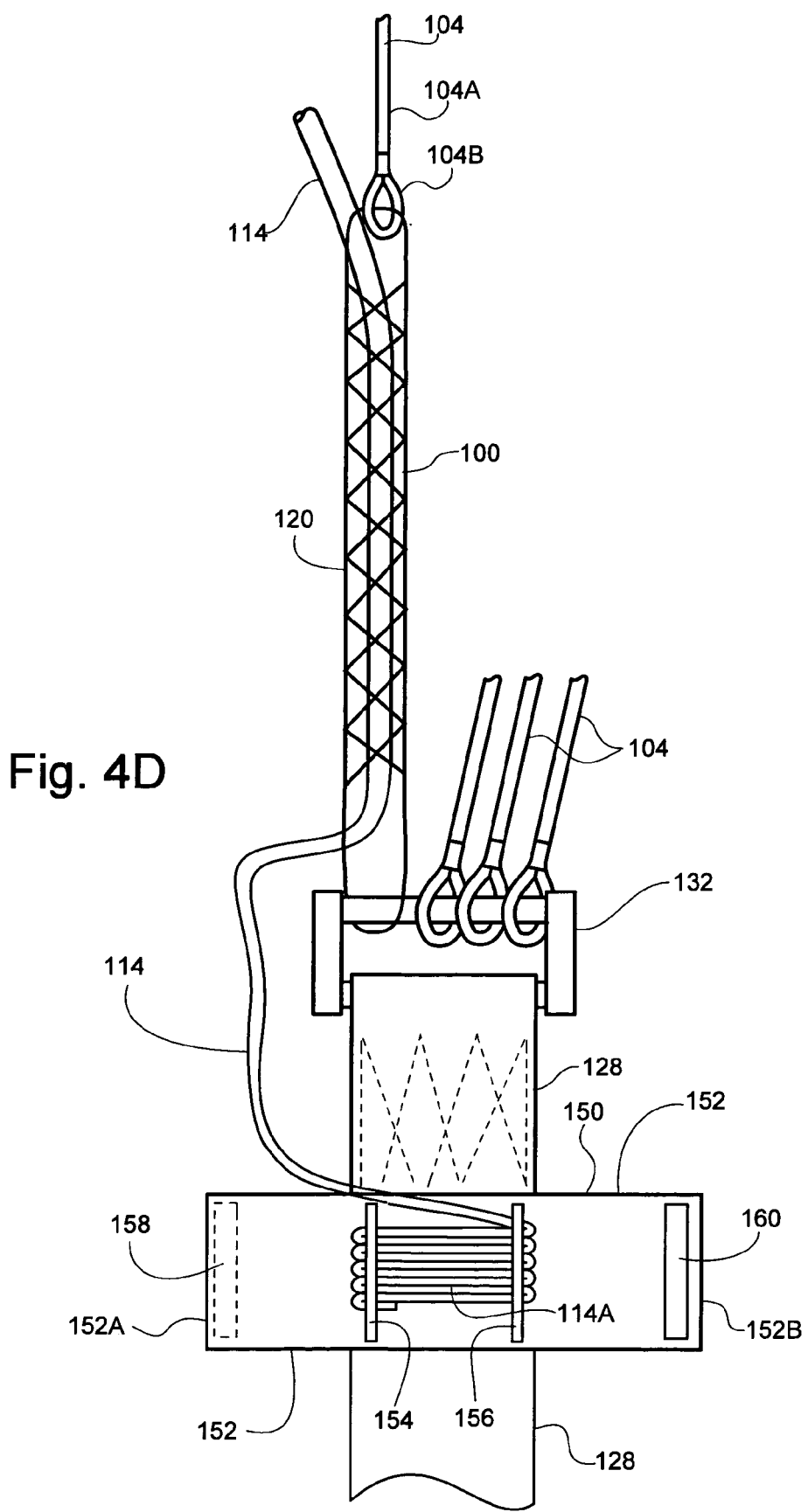
FIG. 4D is an elevational view of the continuous disreefing apparatus of the present invention in combination with a device for stowing excess reefing line.

FIG. 4A shows a normal attachment of sleeve 120 to riser link 132 and suspension line 104A to the opposite end of sleeve 120. This configuration is suitable when the parachute system is manufactured with continuous disreefing apparatus 100. FIG. 4B shows an alternate technique for attaching sleeve 120 to riser link 132. Link 140 is removably connected to riser link 132. Sleeve 120 is removably connected link 140. This configuration shown in FIG. 4B is suitable for a retrofit-type situation wherein an existing parachute system is modified to use the continuous disreefing apparatus 100 of the present invention. FIG. 4C shows an alternate technique for attaching a sensing suspension line to sleeve 120. In this configuration, suspension line 144 functions as a sensing suspension line. Suspension line 144 is attached to loop 146. Loop 146 is attached to sleeve 120. The end of suspension line 144 is connected to riser link 132 in the standard fashion. Suspension line 144 is relatively longer than the other suspension lines 104 so that continuous disreefing apparatus 100 operates freely without constraint. This configuration makes certain that the sensing suspension line 144 is always connected to riser link 132. In one embodiment, loop 146 is stitched to sensing suspension line 144. FIG. 4D shows the configuration of FIG. 4A with the addition of stowage device 150 that allows excess reefing line 114 to be stowed. Device 150 includes a body of fabric 152 having ends 152A and 152B. Body of fabric 152 is attached to riser 128. In one embodiment, fabric 152 is stitched to riser 128. Device 150 further includes stow loops 154 and 156 that are attached to body of fabric 152. The excess portion 114A of reefing line 114 is wrapped around stow loops 154 and 156. Body of fabric 152 includes a hook and pyle fastening system that is comprised of portion 158 and complementary portion 160. This type of fastening system allows ends 152A and 152B of body of fabric 152 to be removably attached together so as to cover the stowed excess portion 114A of reefing line 114.

Referring to FIGS. 2 and 4A, during packing of the parachute system, a predetermined length of single reefing line 114, indicated by reference number 114A, is drawn through sleeve 120 in the direction of riser link 132 so as to establish an initial reefing position. This initial reefing position allows parachute canopy 102 to open to a predetermined initial diameter prior to the start of the continuous disreefing process. When parachute canopy 102 begins to open, tension is produced in suspension line 104A which causes sleeve 120 to contract diametrically. This diametric contraction of sleeve 120 impedes the movement of single reefing line 114 in the direction of canopy 102. As a result, the movement of reefing line 110 is impeded which, in turn, impedes or retards inflation of canopy 102. Once the initial deceleration of payload 124 occurs due to the initial, predetermined reefed canopy size, the tension in suspension line 104A begins to decrease which causes a decrease or relaxation of the forces that caused the diametrical contraction of sleeve 120. This relaxation or decrease in these forces allows single reefing line 114 to start sliding through sleeve 120 more rapidly. The greater the rate of deceleration, the faster single reefing line 114 slides through sleeve 120. The rate at which single reefing line 114 slides through sleeve 120 depends on the tension forces, created by deceleration of payload 124, transmitted through suspension line 104A to link 132. If single reefing line 114 accelerates through sleeve 120, then reefing line 110 is able to quickly move thereby allowing canopy 102 to expand and inflate at an accelerated rate. This in turn increases the deceleration on the entire parachute system and payload 124 thereby causing an increase in the suspension line forces and in particular, the forces on suspension line 104A. This increase in the force or tension on suspension line 104A diametrically contracts sleeve 120 thereby slowing or impeding the movement of single reefing line 114 through sleeve 120 so as to slow or impede the opening of canopy skirt 108. This self-regulating process is continuous throughout the entire parachute-opening process and ends when the parachute canopy 102 is fully opened.

Continuous disreefing apparatus 100 acts essentially as a linear brake device using the force in a suspension line 104A to control the breaking function of continuous disreefing apparatus 100. The implementation of the braking function of continuous disreefing apparatus 100 depends on several factors including the length of sleeve 120, the diameter of single reefing line 114, and the friction coefficients between the materials used to fabricate continuous disreefing apparatus 100 and of single reefing line 114. For example, the degree of coarseness in the braid of sleeve 120 is a factor that affects the braking function of continuous disreefing apparatus 100.

Figure 5:
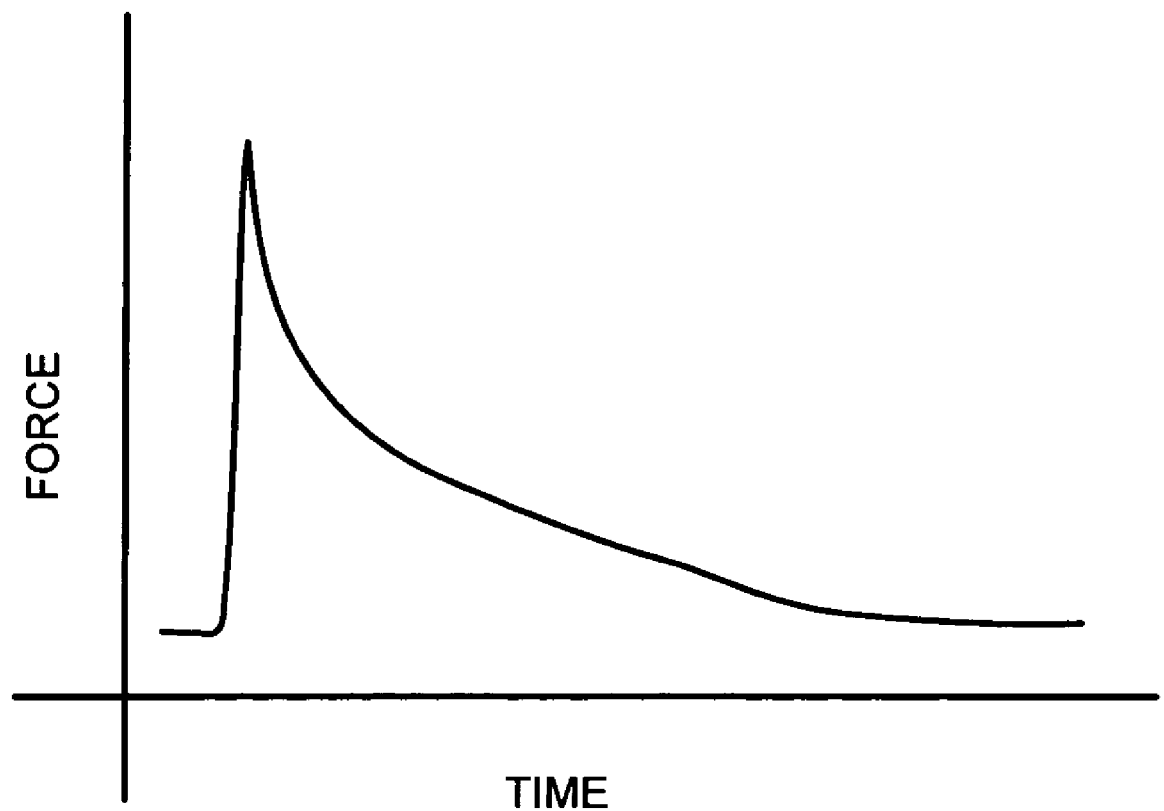
FIG. 5 is a graph that illustrates theoretical predicted forces on a parachute system during the opening process wherein the parachute system uses the continuous disreefing apparatus of the present invention.

The continuous disreefing apparatus of the present invention takes advantage of the fact that each parachute suspension line carries an equal portion of the peak opening forces during symmetrical parachute openings. Each suspension line acts as a load bearing structural member and mechanical load sensor. Thus, as shown in FIG. 4A, suspension line 104A functions as a load sensor that controls sleeve 120 to either impede the movement of single reefing line 114 or to allow single reefing line 114 to move toward canopy 102 unimpeded. FIG. 5 illustrates the theoretical opening force trace of a parachute that utilizes the continuous disreefing apparatus of the present invention. This force trace shows the parachute system opening with a relatively lower (than without the present invention) but constant force throughout deceleration until final, steady state descent is attained.

Figure 8:
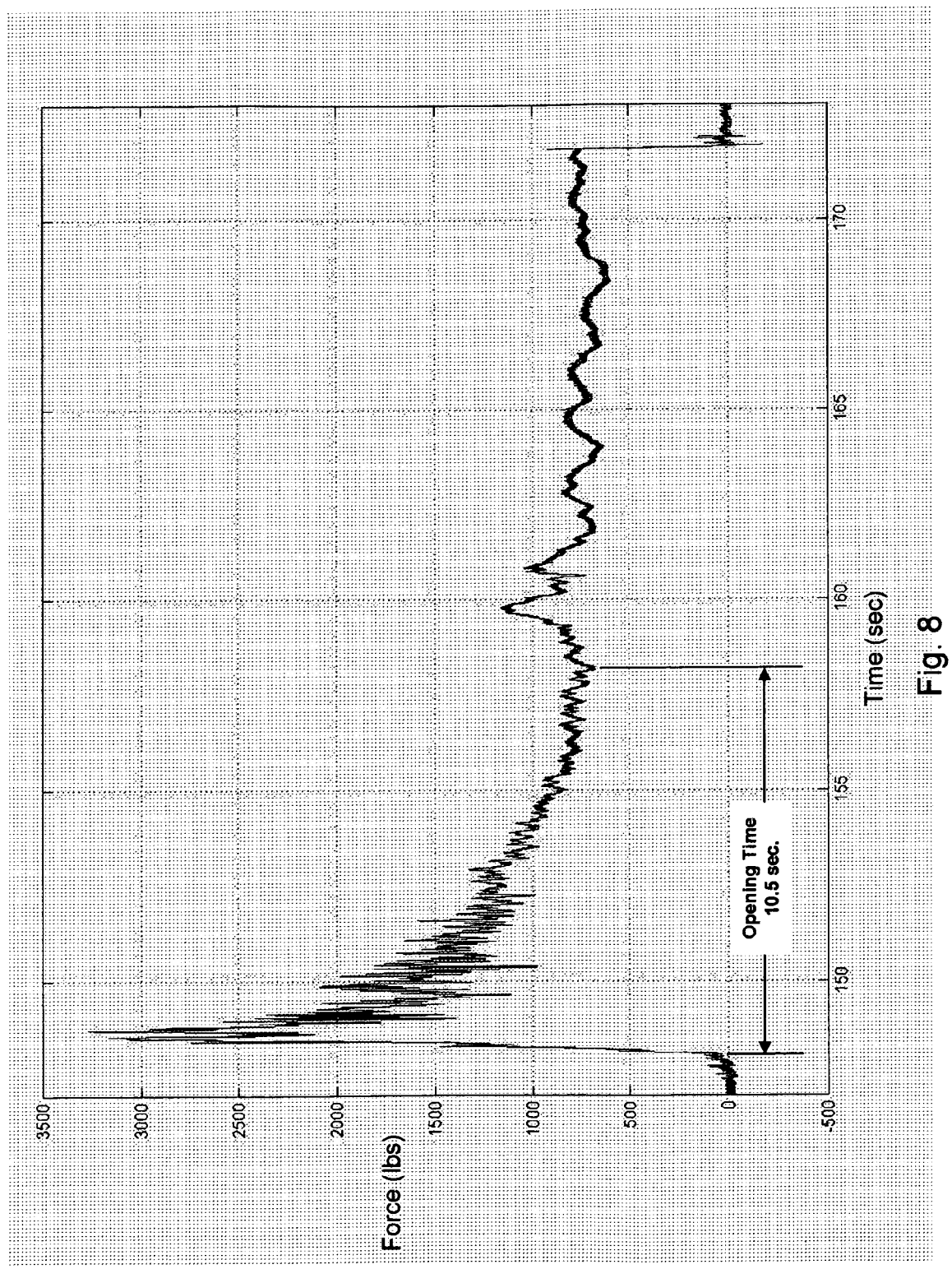
FIG. 8 is a graph that illustrates actual forces on a parachute system during the opening process wherein the parachute system uses the continuous disreefing apparatus of the present invention.

FIG. 8 shows the results of an instrumented test showing the actual opening force versus opening time trace of a parachute that is opening with the continuous disreefing apparatus of the present invention. The overload, payload weight is six hundred and twenty five pounds. The system was dropped and allowed to fall for twenty one seconds reaching a velocity of over two hundred twenty five miles per hour vertically, at which time the parachute was deployed to recover the payload. The parachute has a constructed diameter of twenty eight feet with twenty eight gores and twenty eight suspension lines. It was initially reefed to a diameter of four feet. This type of parachute normally takes less than two seconds to open under these deployment conditions with a two hundred twenty five pound payload. As shown in FIG. 8 this parachute required more than ten seconds to fully open with the continuous disreefing apparatus. This translates to lower opening forces on the entire parachute/payload system and a recovery with no damage to the parachute. When FIG. 8 is compared to the predicted, theoretical opening force versus opening time in FIG. 5, the results are similar.

The continuous disreefing apparatus includes a parachute suspension system which has suspension lines, and the suspension system including the suspension lines performs as a mechanical sensing device for automatically controlling the function of continuous disreefing.

Although the foregoing description has been in terms of a parachute system using one continuous disreefing apparatus of the present invention, it is to be understood that a pair of apparatuses 100 can be used wherein one apparatus 100 is connected to riser link 132, as shown, and the other apparatus 100 is connected riser link 130. Such an embodiment is explained in the ensuing description.

Figure 6:
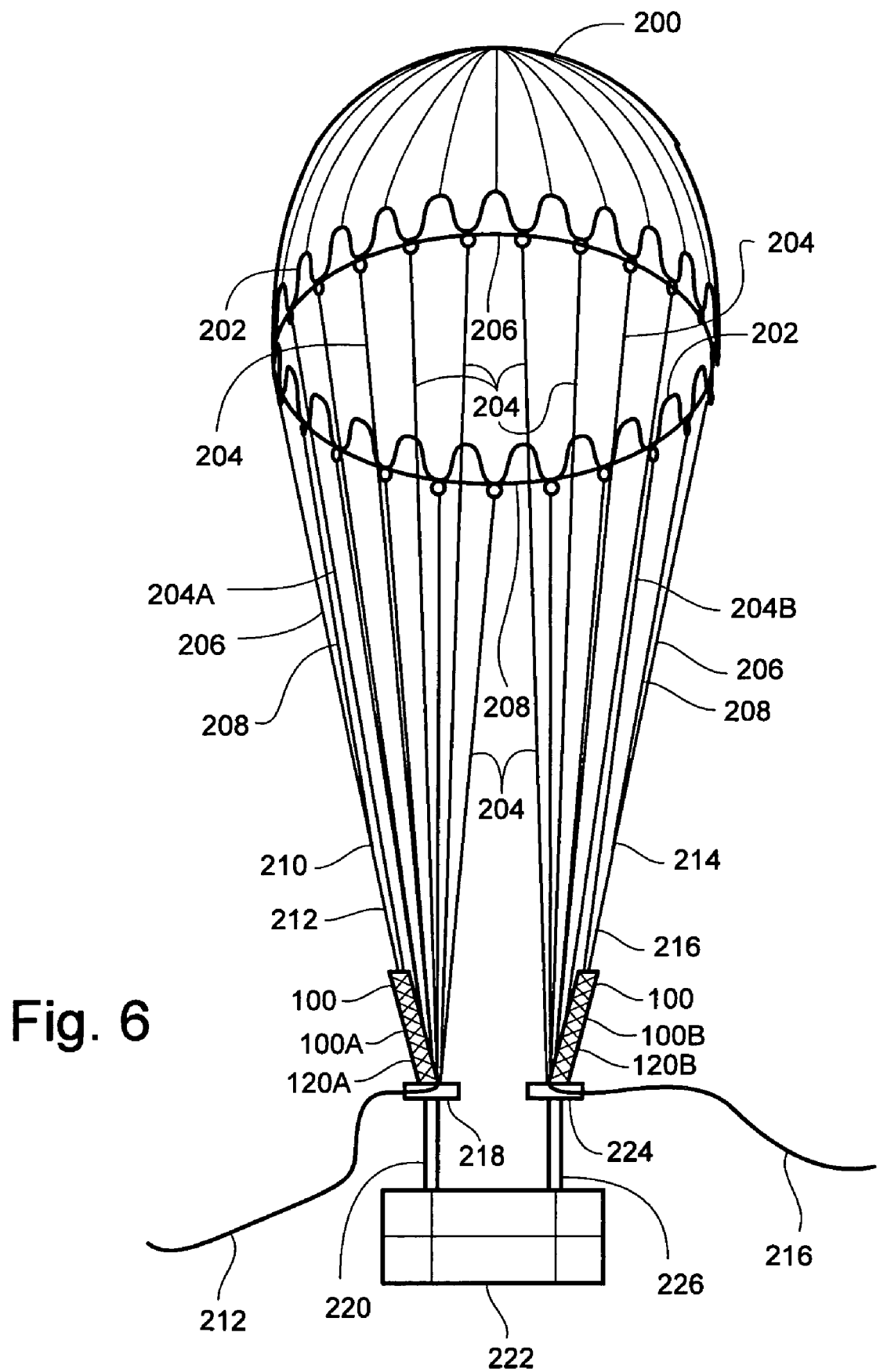
FIG. 6 is a front elevational view of a parachute system that uses multiple continuous disreefing apparatuses of the present invention.

Referring to FIG. 6, there is shown a parachute system that utilizes more than one continuous disreefing apparatus of the present invention. For purposes of facilitating understanding of this embodiment, these continuous disreefing apparatuses are indicated by reference numbers 100A and 100B. Each continuous disreefing apparatus 100A and 100B is identical in construction to continuous disreefing apparatus 100 described in the foregoing description. Continuous disreefing apparatus 100A comprises sleeve 120A which is identical in construction and function to sleeve 120 described in the foregoing description. Similarly, continuous disreefing apparatus 100B comprises sleeve 120B which is identical in construction and function to sleeve 120 described in the foregoing description. In this configuration, the parachute system includes canopy 200, canopy skirt 202, and parachute suspension lines 204. For purposes of simplicity in describing this embodiment, not all suspension lines 204 are shown. This parachute system also includes a reefing line that is divided into two parts: reefing line 206 and reefing line 208. Reefing line 206 is positioned on the front half of parachute canopy 200 and reefing line 208 is positioned on the rear half of parachute canopy 200. One end of reefing line 206 is joined to one end of reefing line 208 at junction 210 to form single reefing line 212. Similarly, the opposite ends of reefing lines 206 and 208 are joined at junction 214 to form single reefing line 216. Continuous disreefing apparatus 100A is connected to link 218. Riser 220 is connected to and between link 218 and payload 222. Similarly, continuous disreefing apparatus 100B is connected to link 224. Riser 226 is connected to and between link 224 and payload 222. Suspension lines 204A and 204B are connected to sleeves 120A and 120B, respectively, in the same manner in which suspension line 104A is connected to sleeve 120 (see FIG. 4A). Reefing lines 212 and 216 extend through sleeves 120A and 120B, respectively, in the same manner in which single reefing line 114 extends through sleeve 120 (see FIG. 4A). Continuous disreefing apparatuses 100A and 100B function in exactly the same manner as continuous disreefing apparatus 100 discussed in the foregoing description. Tension on suspension line 204A causes sleeve 120A to diametrically contract which impedes movement of single reefing line 212 through sleeve 120A. As deceleration decreases, tension on parachute suspension line 204A decreases thereby allowing relaxation of the diameter of sleeve 120A. This relaxation allows single reefing line 212 to move unimpeded in the direction of canopy 200. Similarly, tension on suspension line 204B causes sleeve 120B to diametrically contract which impedes movement of single reefing line 216 through sleeve 120B. As deceleration decreases, tension on parachute suspension line 204B decreases thereby allowing relaxation of the diameter of sleeve 120B. This relaxation allows reefing line 216 to move unimpeded in the direction of canopy 200. The movement of single reefing lines 212 and 216 directly affect the movement of reefing lines 206 and 208 which control the rate at which canopy 200 opens.

Although two continuous disreefing apparatuses are shown in FIG. 6, it is to be understood that more than two continuous disreefing apparatuses 100 may be required depending on deployment velocities of the parachute, altitude, canopy design and the mass of the payload.

Figure 7:
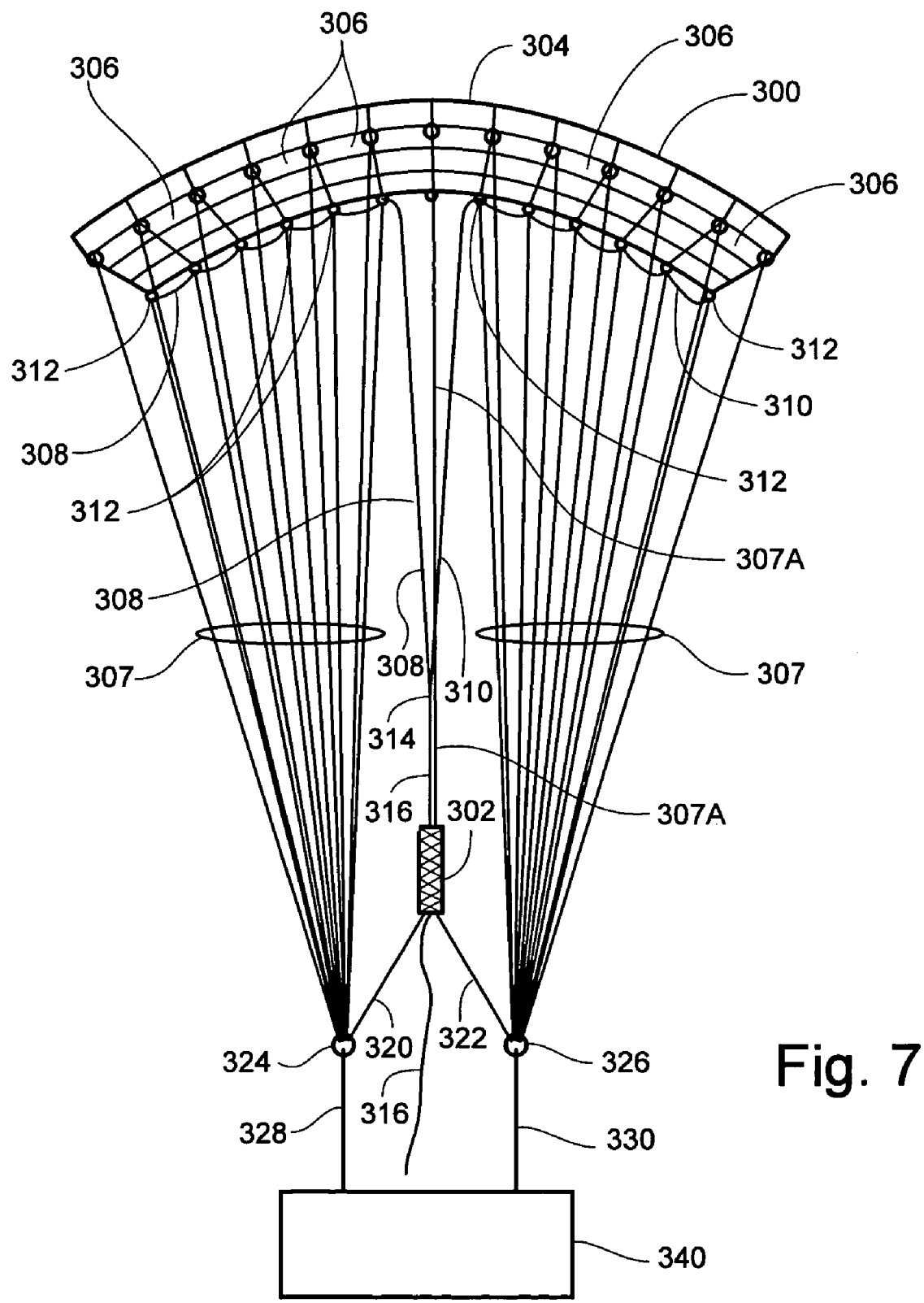
FIG. 7 is a front view, partially in perspective, of a gliding canopy that uses the continuous disreefing apparatus of the present invention.

Referring to FIG. 7, there is shown a front view of a rectangular gliding canopy 300 that uses the continuous disreefing apparatus of the present invention, indicated by reference number 302. It is to be understood that continuous disreefing apparatus 302 has the same structure and functions in the same manner as continuous disreefing apparatus 100 shown in FIGS. 4A-4D. This view is of the opening phase of gliding canopy 300 and shows leading edge 304 as cells 306 inflate. Suspension lines 307 extend downward from canopy 300. Reefing lines 308 and 310 pass through reefing rings 312 on the lower surface of canopy 300 and are joined together at junction 314 to form single reefing line 316. Single reefing line 316 extends through continuous disreefing apparatus 302. Lines or lanyards 320 and 322 connect continuous disreefing apparatus 302 to links 324 and 326, respectively. Risers 328 and 330 are connected between links 324 and 326, respectively, and payload 340. Force in suspension line 307A is the sensing or control force for continuous disreefing apparatus 302 in the same manner in which suspension line 104A is the sensing or control force for continuous disreefing apparatus 100 (see FIG. 4A). Continuous disreefing takes place from the center of canopy 300 toward its tips in a spanwise direction.

Multiple continuous disreefing apparatuses of the present invention can also be used on rectangular, flexible wing-type gliding parachutes. However, the actual number of continuous disreefing apparatuses used depends on the same variables as round parachutes, namely, deployment velocity, altitude, canopy design and mass of payload.

The principles, preferred embodiments and modes of operation of the present invention have been described in the foregoing specification. This invention should not be construed as limited to the particular forms disclosed, as these are to be regarded as illustrative rather than restrictive. Variations and changes may be made by those skilled in the art without departing from the spirit of the invention. Accordingly, the foregoing detailed description should be considered as exemplary in nature and not limiting the scope and spirit of the invention as set forth in the attached claims.

What is claimed is:

1. A continuous disreefing apparatus, comprising:
   a sleeve having a diameter and being made from a flexible, resilient material that allows the sleeve to diametrically contract when the sleeve is under tension and to diametrically relax when such tension is substantially reduced or removed, the sleeve having a portion thereof configured for connection to a parachute suspension line; and
   a reefing line extending through the sleeve and arranged for movement with respect to the sleeve wherein the rate at which the reefing line moves through the sleeve is controlled by the amount of tension on the sleeve.

2. The continuous disreefing apparatus according to claim 1 wherein the sleeve has a portion configured to be attached to a suspension line link.

3. The continuous disreefing apparatus according to claim 1 wherein the sleeve has a generally cylindrical shape.

4. The continuous disreefing apparatus according to claim 1 wherein the apparatus comprises a parachute suspension system, said system having the suspension lines, and wherein said suspension system including the suspension lines performs as a mechanical sensing device for automatically controlling the function of continuous disreefing.

5. The continuous disreefing apparatus according to claim 1 wherein the sleeve comprises a coarse braided cylindrical sleeve.

6. The continuous disreefing apparatus according to claim 5 wherein the coarse braided cylindrical sleeve is fabricated from steel wire.

7. A continuous disreefing apparatus, comprising:
   a parachute suspension line link;
   a sleeve having a diameter and being made from a flexible, resilient material that allows the sleeve to diametrically contract when the sleeve is under tension and to diametrically relax when such tension is substantially reduced or removed, the sleeve having a first end portion and a second end portion opposite the first end portion, the first end portion being attached to the parachute suspension line link;
   a force sensing suspension line attached to the second end portion of the sleeve;
   a reefing line extending through the sleeve and arranged for movement through the sleeve wherein the rate at which the reefing line moves through the sleeve is controlled by the amount of tension on the sleeve; and
   whereby when the force sensing suspension line has a tension force thereon, the sleeve diametrically contracts thereby impeding the movement of the reefing line through the sleeve and when the tension force decreases, the reefing line slides through the sleeve at a relatively faster rate.

8. The continuous disreefing apparatus according to claim 7 wherein the sleeve has a generally cylindrical shape.

9. The continuous disreefing apparatus according to claim 6 wherein the sleeve comprises a coarse braided cylindrical sleeve.

10. The continuous disreefing apparatus according to claim 9 wherein the coarse braided cylindrical sleeve is fabricated from steel wire.

11. The continuous disreefing apparatus according to claim 7 further comprising a device for storing excess reefing line that extends from the sleeve.

12. The continuous disreefing apparatus according to claim 7 wherein the first end portion of the sleeve is removably attached to the parachute suspension line link.

13. A parachute system, comprising:
   a link;
   a sleeve having a diameter and being made from a flexible, resilient material that allows the sleeve to diametrically contract when the sleeve is under tension and to diametrically relax when such tension is substantially reduced or removed, the sleeve having a first end portion and a second end portion opposite the first end portion, the first end portion being attached to the link;
   a canopy having a skirt;
   a plurality of suspension lines, a predetermined one of the plurality of suspension lines being attached to and between the canopy skirt and the second end of the sleeve, the remaining suspension lines of the plurality of suspension lines being attached to and between the canopy skirt and the link;
   a plurality of reefing rings attached to the canopy skirt;
   a main reefing line extending through all of the plurality of reefing rings, the reefing line having a pair of ends joined together at a junction point to form a single reefing line, the single reefing line extending through the sleeve and arranged for movement through the sleeve wherein the rate at which the single reefing line moves through the sleeve is controlled by the amount of tension on the sleeve;
   a riser having one attached to the link and an opposite end configured for attachment to a payload; and
   whereby when the predetermined one of the plurality of suspension lines has a tension force thereon, the sleeve diametrically contracts thereby impeding the movement of the single reefing line through the sleeve so as to slow the opening process of the canopy and when the tension force decreases, the single reefing line slides through the sleeve at a relatively faster rate thereby allowing the canopy to open at a relatively faster rate.

14. The parachute system according to claim 13 wherein the predetermined one of the plurality of suspension lines has a first length and each of the remaining suspension lines of the plurality of suspension lines has a second length that is greater than the first length.

15. The parachute system according to claim 13 wherein the predetermined one of the plurality of suspension lines has a first length and each of the remaining suspension lines of the plurality of suspension lines has a second length that is less than the first length.

* * * * *